3,100,152
METHOD FOR MAKING A GROUND MEAT FOOD PRODUCT
Beverly E. Williams, La Grange Park, Ill., assignor to Hodges Research and Development Company, New York, N.Y., a corporation of California
No Drawing. Filed Aug. 16, 1960, Ser. No. 49,825
3 Claims. (Cl. 99—108)

This invention relates to ground meat food products and more particularly to such products that are mixtures of ground meat and tendered diced muscle and organ meat.

This application is a continuation-in-part of my application Serial No. 826,921, filed July 14, 1959, now abandoned.

Ground meat is such a well known part of the American diet that its popularity and widespread acceptance need not be discussed. Ground meat if fresh and of good quality is usually delicious even though of a somewhat sameness and blandness of taste. I have found that if with the conventional ground meat of beef, lamb, veal or pork or mixtures thereof there is mixed diced pieces of tendered muscle meat from beef, lamb or mutton or mixtures thereof or organ meat such as heart or liver or mixtures thereof of beef, lamb, veal, mutton or pork or mixtures thereof in amounts from ¼ to ⅓, and in no case over ½ of the total meat pattie by weight, that the bland flavor of the ground meat is superseded by a delicious taste sensation brought about by the presence of the diced muscle or organ meat. The ground meat mixture then has a difference in chewiness and a taste sensation that must be experienced to be appreciated. A parallel situation is to be encountered in "crunch" peanut butter where whole peanuts are included in the blend.

The size of the diced pieces of tendered meat is of importance in obtaining the desired taste sensation of this novel food product. The size of the diced pieces or chunks mixed with the ground meat should not exceed one-half to one inch in length, width or depth and preferably should be from one-quarter to one-half inch in any dimension. It is obvious that the diced pieces need not be cubical and the dimensions of the pieces may vary from one-quarter to one inch. The diced pieces of meat in size as described should be admixed with the ground meat preferably in the range of one-quarter to one-third of the total weight of the meat pattie, and, in no case, over one-half of the total weight of the pattie.

The tendering of the muscle or organ meat is of importance since the desired delectable result will not be obtained if the diced meat is tough. The diced meat should be tenderized to a point where the diced pieces are in approximately the same state of tenderness as the ground meat. Even though the diced pieces of meat are approximately of the same tenderness as the ground meat they will not cook to the same degree of doneness as the ground meat so that this composite meat food product when cooked gives a novel taste sensation by reason of the presence of the pieces of diced meat, which have not been cooked to the same degree of doneness as the ground meat. This results in a juicier composite food product or pattie.

Organ meat, such as the heart or liver or mixtures thereof of beef, lamb, veal, mutton or pork, is tough and must be tenderized either before or after dicing. Tendering of the organ meat can be accomplished by various methods and is preferably obtained by the use of proteolytic enzymes. The organ meat may be dipped in a suitable enzyme solution or the organ meat may be soaked in it until the desired degree of tenderness is obtained. If the organ meat is undiced it may be tendered by introduction into the meat of the enzyme solution by stitch pumping in known manner until the desired degree of tendering is obtained. If the organ meat is to be injected with the enzyme solution the solution should weigh about six percent of the weight of the meat. The enzyme solution is preferably an aqueous solution containing appropriate amounts of a proteolytic enzyme. A suitable aqueous enzyme solution may contain about 0.012% asclepain; or 0.05% mushroom enzyme; or 0.012% papain; or 0.005% ficin; or 0.015% macin; or about 0.035% bromelin, depending upon the purity and potency of the proteolytic enzyme.

Ground meat food products prepared as above have been declared by taste panel experts to be delicious; of delightful taste sensation; and a welcome change from the unvarying sameness of flavor of the conventional ground meat.

The ground meat food product of the present concept is considerably more nutritious than conventional ground meat because of the natural vitamins present in muscle and organ meats. The cost of the muscle and organ meat may be considerably less than that of ground meat and the food product of the present invention is therefore of lower cost than conventional ground meat while having the advantages of more delicious flavor and more nutrition.

It is obvious from the above that the novel ground meat food product of the present invention is capable of considerable variation in proportions of ingredients, of tenderness of ingredients, and of the ground meat and of the muscle and organ meats employed therein. Reference should therefore be had to the appended claims to determine the scope of this invention.

What is claimed is:

1. In a method for making a ground meat food product the steps of grinding meat, dicing tendered meats selected from the group consisting of muscle and organ meats having approximately the same degree of tenderness as the ground meat and mixing said ground and diced meats with said diced meat being present in amounts of from one-quarter to not more than one-half by weight, the pieces of diced meat ranging in size from approximately one-quarter inch to approximately one inch in any dimension.

2. In a method for making a ground meat food product the steps of grinding meat, dicing a mixture of enzyme tendered organ meats and mixing said ground and diced meats with said diced meats being present in amounts of from approximately one-quarter to not exceeding one-half by weight, the diced organ meats having substantially the same degree of tenderness as the ground meat and the pieces of diced organ meats ranging in size from approximately one-quarter to approximately one inch in any dimension.

3. In a method for making a ground meat food product the steps of grinding meat selected from the group consisting of beef, lamb, veal, pork and mixtures thereof, dicing enzyme tendered meats selected from the group consisting of muscle meat from beef, lamb, mutton and mixtures thereof and organ meats from beef, lamb, veal, mutton, pork and mixtures thereof having approximately the same degree of tenderness as the ground meat and mixing said ground and diced meats with said diced meats being present in amounts of from one-quarter to not more than one-half by weight, the pieces of diced meat ranging in size from approximately one-quarter inch to approximately one inch in any dimension.

References Cited in the file of this patent

UNITED STATES PATENTS

| | | |
|---|---|---|
| 2,447,427 | Oftedahl | Aug. 17, 1948 |
| 2,622,029 | Torr | Dec. 16, 1952 |
| 2,820,709 | Schack et al. | Jan. 21, 1958 |